United States Patent [19]
Nitta et al.

[11] Patent Number: 6,075,086
[45] Date of Patent: Jun. 13, 2000

[54] POLYPROPYLENE RESIN COMPOSITION AND METHOD FOR COATING MOLDED PRODUCTS OF THE RESIN COMPOSITION

[75] Inventors: Katsuyuki Nitta; Keigo Suehiro; Yoichi Kawai; Katsumi Sekiguchi; Takeaki Inokuma; Yoshiyasu Kamiya, all of Kanagawa, Japan

[73] Assignee: Mitsui Chemicals, Inc., Japan

[21] Appl. No.: 08/081,199

[22] Filed: Jun. 25, 1993

Related U.S. Application Data

[62] Division of application No. 07/669,015, Mar. 13, 1991, Pat. No. 5,247,007.

[30] Foreign Application Priority Data

Mar. 16, 1990 [JP] Japan ........................................ 2-64262
Mar. 26, 1990 [JP] Japan ........................................ 2-73262

[51] Int. Cl.[7] ...................................................... C08L 9/00
[52] U.S. Cl. ............................................ 524/525; 525/232
[58] Field of Search .............................. 524/525; 525/232

[56] References Cited

U.S. PATENT DOCUMENTS

| | | |
|---|---|---|
| 4,480,065 | 10/1984 | Kawai et al. . |
| 4,734,450 | 3/1988 | Kawai et al. . |
| 4,735,988 | 4/1988 | Takada et al. . |
| 4,737,536 | 4/1988 | Kawase et al. . |
| 4,945,005 | 7/1990 | Aleckner, Jr. et al. . |
| 4,946,896 | 8/1990 | Mitsuno et al. . |
| 4,997,720 | 3/1991 | Bourbonais et al. . |

FOREIGN PATENT DOCUMENTS

| | | |
|---|---|---|
| 069479 | 1/1983 | European Pat. Off. . |
| 153415 | 9/1985 | European Pat. Off. . |
| 200340 | 11/1986 | European Pat. Off. . |
| 204400 | 12/1986 | European Pat. Off. . |
| 248543 | 9/1987 | European Pat. Off. . |
| 61-89239 | 5/1986 | Japan . |
| 62-64848 | 3/1987 | Japan . |
| 62-119243 | 5/1987 | Japan . |

OTHER PUBLICATIONS

Patent Abstracts of Japan, vol. 12, No. 301 (C–521) [3148], Aug. 16,1988.

*Primary Examiner*—Edward J. Cain
*Attorney, Agent, or Firm*—Burns, Doane, Swecker, & Mathis, L.L.P.

[57] ABSTRACT

Herein provided are a polypropylene resin composition which comprises (A) a polypropylene, (B) an ethylene-propylene-diene terpolymeric rubber having a Mooney viscosity, $ML_{1+4}$ (100° C.), ranging from 5 to 50 and an iodine value of not less than 15, the content of the component (B) ranging from 10 to 50% by weight on the basis of the total weight of the components (A) and (B), and optionally (C) an inorganic filler in an amount ranging from 0 to 40 parts by weight per 100 parts by weight of the sum of the components (A) and (B); a coating method which comprises the steps of applying a primer coating to a molded product obtained by molding the foregoing polypropylene resin composition or irradiating the molded product with plasma without degreasing and washing the product with a halogen atom-containing organic solvent and then applying a top coat to the product; and a coating method which comprises the steps of degreasing and washing a molded product obtained by molding the foregoing polypropylene resin composition and then applying a top coat to the product without applying a primer coating to the molded product or irradiating the molded product with plasma. The coated film obtained according to the foregoing methods has good bond strength to the molded product.

12 Claims, No Drawings

POLYPROPYLENE RESIN COMPOSITION AND METHOD FOR COATING MOLDED PRODUCTS OF THE RESIN COMPOSITION

This application is a divisional, of application Ser. No. 07/669,015, filed Mar. 13, 1991 now U.S. Pat. No. 5,247,007.

BACKGROUND OF THE INVENTION

1. Field of the Invention

The present invention relates to a polypropylene resin composition which can be readily coated, in particular an impact-resistant polypropylene resin composition suitably used in making exterior automotive trims such as a bumper and a method for coating a molded product of the polypropylene resin composition, in particular, an exterior automotive trim such as a bumper.

2. Description of the Related Art

Polypropylene resins have been widely used in various fields because of low specific gravity and high rigidity as well as their excellent heat resistance and resistance to chemical attack. However, it has been known that the polypropylene resins have insufficient capacity of being coated since they are non-polar by nature. For instance, when an automotive bumper of polypropylene is coated, the bumper must be degreased and washed with a halogen atom-containing organic solvent such as 1,1,1-trichloroethane, then coated with a primer layer as an underlying coating or irradiated with plasma and thereafter a top coat must be applied thereto in order to achieve a sufficient bond strength to the coating layer.

The foregoing coating techniques require many processes and are not economical from the viewpoint of treating time. In addition, it is feared that the halogen atom-containing organic solvents used for degreasing and washing the polypropylene resin articles may adversely affect the human body and environment and correspondingly it has been desired for the immediate development of a means for solving this problem. Moreover, it can be appreciated that the coating methods conventionally carried out are quite uneconomical while taking the time and expense devoted in the treatment of waste liquid into consideration.

Under such circumstances, there have been proposed, from the viewpoint of reduction in the number of coating processes and of labor savings, various techniques which make it possible to delete the process for applying an underlying coating or which are adapted for so-called primer-less coating in the coating of automotive bumpers of polypropylene. For instance, there have been known (1) methods in which a compound having a polar group is grafted on polypropylene (Japanese Patent Unexamined publication (hereinafter referred to as "J.P. KOKAI") Nos. Sho 62-64848 and Sho 62-119243); and (2) methods in which a polar substance is blended with polypropylene (J.P. KOKAI Nos. Sho 51-145553 and Sho 61-89239).

However, the methods (1) in which a compound having a polar group is grafted onto polypropylene suffer from such problems that the compounds used therein are toxic and that physical properties of the resulting resin composition are impaired. Moreover, the bond strength to a coating applied to the polypropylene articles is still insufficient. The methods (2) in which a polar substance is blended with polypropylene simply provide a polypropylene article having a bond strength which is insufficient for use as a material for making bumpers.

Further, both the methods (1) and (2) include a process for degreasing and washing polypropylene articles with a solvent (1,1,1-trichloroethane) as an indispensable process and, therefore, it is necessary to work out Measures to solve the problems of detrimental effects of solvents on the human body and environments and of the treatment of waste liquid.

SUMMARY OF THE INVENTION

Accordingly, an object of the present: invention is to provide an impact-resistant polypropylene resin composition which permits the application of a top coat after applying a primer layer or irradiating with plasma without degreasing and washing with a halogen atom-containing solvent such as 1,1,1-trichloroethane; or after degreasing and washing without applying any primer layer or without irradiating with plasma and which is extremely adapted for the production of molded products whose bond strength against a coating film of a paint or varnish for top coats, in particular, an impact-resistant polypropylene resin composition which is excellent in capacity of being coated and is suitably used in making exterior automotive trims such as bumpers as well as a method for coating a molded product obtained by molding the resin composition.

Under such circumstances, the inventors of this invention have conducted intensive investigations, and as a result have found out that a composition comprising polypropylene which is blended with a specific ethylene-propylene-diene terpolymer in a specific compounding ratio permits the application of a top coat after applying a primer layer or irradiating with plasma without degreasing and washing with a halogen atom-containing solvent such as 1,1,1-trichloroethane; or after degreasing and washing without applying any primer layer or without irradiating with plasma arid is excellent in bond strength with a coating film of a paint or varnish for top coats and thus have completed the present invention.

The present invention thus relates to a polypropylene resin composition which can be readily coated which comprises (A) polypropylene and (B) an ethylene-propylene-diene terpolymeric rubber having a Mooney viscosity, $ML_{1+4}$ (100° C.), ranging from 5 to 50 and an iodine value of not less than 15, in which the content of the component (B) ranges from 10 to 50% by weight on the basis of the total weight of the components (A) and (B) and which optionally comprises (C) an inorganic filler in an amount ranging from 0 to 40 parts by weight per 100 parts by weight of the sum of the components (A) and (B).

The present invention also relates to a method for coating a molded product obtained by molding the polypropylene resin composition, which comprises the steps of applying a primer layer to the molded product or irradiating the product with plasma and then applying a top coat thereto without degreasing and washing the product with a halogen atom-containing organic solvent.

In addition, the present invention relates to a method for coating a molded product obtained by molding the polypropylene resin composition, which comprises the steps of degreasing and washing the molded product and then applying a top coat thereto without applying any primer layer to the molded product or without irradiating the product with plasma.

DESCRIPTION OF THE PREFERRED EMBODIMENTS

The polypropylene used in the present invention may be any crystalline polypropylene and may be a homopolymer of propylene or a random or block copolymer of propylene with ethylene and/or an α-olefin. The term "α-olefin" herein means, for instance, butene-1, pentene-1, hexene-1 and 4-methylpentene-1 which can be used alone or in any combination thereof in the present invention.

In the present invention, it is desirable to use homopolymers of propylene or random or block copolymers of propylene with ethylene. Preferably used in the present invention are propylene-ethylene block copolymers, in particular those having an ethylene content ranging from 5 to 25% by weight and a melt index (MI) ranging from 0.1 to 100 g/10 min (as determined according to ASTM D-1238 at 230° C.).

The ethylene-propylene-diene terpolymeric rubber used in the present invention has a Mooney viscosity, $ML_{1+4}$ (100° C.) ranging from 5 to 50, preferably 10 to 30 and an iodine value of not less than 15, preferably 17 to 25 and more preferably 21 to 25.

If the Mooney viscosity $ML_{1+4}$ (100° C.) of the terpolymeric rubber is less than 5, the molded product obtained from the resin composition has bad surface appearance. On the other hand, if it exceeds 50, not only the bond strength is lowered but also the molding properties and the appearance of the resulting molded product are impaired.

If the iodine value of the foregoing terpolymeric rubber is less than 15, a sufficient bond strength with coated films cannot be ensured when the molded product of the resin composition is coated with a primer layer or irradiated with plasma, but is not degreased and washed with a halogen atom-containing organic solvent such as 1,1,1-trichloroethane or when the molded product is degreased and washed with such an organic solvent, but is neither coated with any primer layer nor irradiated with plasma.

The propylene content of the foregoing terpolymeric rubber preferably ranges from 15 to 50% by weight. This is because if it is less than 15% by weight, the impact resistance and the capacity of the resulting molded product to be coated are lowered, while if it is more than 50% by weight, the productivity and quality of the ethylene-propylene-diene rubber obtained are impaired, which makes the handling thereof difficult and the resulting copolymer is not practically acceptable.

As the diene component for the foregoing terpolymeric rubber, there may be used, for instance, dicyclopentadiene, ethylidene norbornene and 1,4-hexadiene. Among these, preferred are dicyclopentadiene and ethylidene norbornene and in particular dicyclopentadiene.

The resin composition of the present invention should have a content of the component (B) ranging from 10 to 50% by weight and preferably 25 to 40% by weight on the basis of the total weight of the components (A) and (B). This is because if the content of the component (B) is less than 10% by weight, the impact resistance and the capacity of the resulting molded product to be coated are lowered, while if it is more than 50% by weight, the rigidity thereof is impaired.

In the present invention, an inorganic filler may optionally be used. The inorganic fillers usable in the present invention are powdery inorganic fillers and specific examples thereof are whiskers of calcium oxide, magnesium oxide, aluminum hydroxide, calcium hydroxide, magnesium hydroxide, magnesium carbonate, calcium silicate, magnesium silicate, calcium sulfate, calcium carbonate, barium sulfate, calcium sulfite, talc, clay, glass, basic magnesium carbonate, dolomite, wollastonite, as well as potassium titanate and magnesium sulfate, but the use of calcium carbonate, barium sulfate, calcium silicate and talc is particularly preferred, when taking the balance between the impact strength and the rigidity of the resulting composition into consideration. The inorganic filler usable in the present invention preferably has an average particle size of not more than 5 μm from the viewpoint of the impact resistance of the resulting composition.

The polypropylene resin composition of the present invention may comprise an inorganic filler in an amount ranging from 0 to 40 parts by weight, preferably 10 to 30 parts by weight per 100 parts by weight of the sum of the components (A) and (B). If the amount of the inorganic filler to be added exceeds 40 parts by weight, the impact resistance and the capacity of the resulting resin composition to be coated and hence the molded product are lowered, in particular blisters are is formed between a resin layer and a coated film due to the moisture absorbed by the inorganic filler present in the resin and the resistance to hot water and resistance to humidity of the resulting product are accordingly impaired.

The inorganic fillers used in the present invention may be surface-treated and the surface treatment can be performed by the use of, for instance, a surface treating agent such as a variety of silane and titanate coupling agents; or a surface treating agent derived from a higher fatty acid or an unsaturated organic acid.

These surface treatments are effective for improving a variety of physical properties such as mixing properties, molding properties, self-tapping strength and weld strength of the resulting composition in addition to the foregoing intended effects of the invention.

The polypropylene resin may further comprise at least one additive commonly used in polypropylene resins such as antioxidants, heat stabilizers, ultraviolet light absorbers, flame retardants, nucleating agents, organic·inorganic pigments in an amount which does not adversely affect the effects of the present invention.

The polypropylene resin composition of the present invention can be obtained by mixing the foregoing components with a mixer commonly employed in this field, for instance, Henschel mixer, then kneading the mixture with, for instance, a single screw extruder, twin-screw extruder, a roll or a Banbury mixer and then forming it into pellets.

The polypropylene resin composition thus obtained can be formed into a desired molded product by any conventional molding method such as an injection molding method, an extrusion molding method or a compression molding method.

In the first embodiment of the method for coating the molded product obtained from the resin composition which comprises the steps of applying a primer layer to the molded product or irradiating the product with plasma and then applying a top coat thereto without degreasing and washing the product with a halogen atom-containing organic solvent, it is not necessary to perform degreasing and washing with a halogen atom-containing organic solvent, but the molded product may optionally be degreased and washed with a solvent other than halogen atom-containing organic solvents. This results in further improvement in the effects of the present invention.

Examples of the foregoing solvents other than halogen atom-containing organic solvents are lower alcohols represented by isopropyl alcohol and surfactant-containing aqueous solutions of alkalis or acids.

As paints or varnishes for forming an underlying coating as a primer layer used in the first embodiment of the method of the present invention, a variety of paints and varnishes represented by two-pack type acryl-chlorinated polypropylene paints or varnishes for underlying coating can be commercially available. After preparing a paint for the primer layer in accordance with each specification, it is applied onto the molded product with a film thickness of the order of 15 μm and then baked and dried by heating, for instance, at 90° C. for 30 minutes.

The surface-treatment with plasma car, be performed by bringing the surface of the molded product in contact with the plasma which is generated by excitation of oxygen, nitrogen, other inert gases or mixtures thereof through irradiation with high frequency or microwave discharge. The conditions for the generation of plasma vary depending on the kinds of the gases used, but are in general a pressure ranging from 0.1 to 5 Torr; a microwave power output ranging from 600 to 1200 W; and a treating time ranging from 5 to 600 seconds. It is a matter of course that the treating time may sometimes be extended and the shape of the treating chamber may also be changed according to the shape of the molded product.

In the second embodiment of the method for coating a molded product obtained by molding the polypropylene resin composition according to the present invention, which comprises the steps of degreasing and washing the molded product and then applying a top coat thereto without applying any primer layer to the molded product or without irradiating the product with plasma, the resulting molded product is first degreased and washed. The term "degreasing and washing of the product" herein used means the removal of anti-corrosive agents for molds, releasing agents, machine oils which are possibly adhered to the surface of the product as well as sebum which is possibly adhered to the product during handling the same.

The degreasing and washing can be performed according to any conventionally known method. The degreasing and washing may be performed by, for instance, bringing the molded product in contact with liquid or steam of a halogen atom-containing organic solvent such as 1,1,1-trichloroethane or trichloroethylene; or an aromatic organic solvent such as benzene, toluene, xylene or chlorobenzene, for 10 to 300 seconds. Then the molded product is allowed to stand in an atmosphere maintained at a temperature ranging from 40 to 100° C. for 60 to 600 seconds to remove the organic solvent adhered to the product. Alternatively, the degreasing and washing can be performed by washing the surface of the product with a lower alcohol such as isopropyl alcohol or a surfactant-containing aqueous solution of an alkali or an acid.

In the second embodiment of the coating method according to the present invention, it is not necessary to apply a primer layer to the molded product or to irradiate it with plasma. Therefore, a top coat is applied to the product subsequently with the foregoing degreasing and washing.

A variety of paints and varnishes for top coats such as two-pack type urethane paints or varnishes and one-pack type alkyd-melamine resin paints or varnishes are commercially available.

Examples of paints and varnishes for the top coat used in the exterior automotive trims are various kinds of two-pack type urethane resin paints and varnishes (film thickness: 100 μm; baked and dried at 80° C. for 40 minutes) and one-pack type alkyd-melamine resin paints or varnishes (film thickness: 100 μm; baked and dried at 120° C. for 40 minutes) having a variety of colors. After coating the top coat, the molded product is allowed to stand at room temperature for 48 hours to harden the coated film and to thus give a coated and molded product.

EXAMPLES

The present invention will hereunder be explained in more detail with reference to the following Examples, but the following Examples are given for only illustrative purposes and do not in any way limit the scope of the present invention.

Examples 1 to 6

There were blended and mixed in a Fenschel mixer, 70 parts by weight of a crystalline ethylene-propylene block copolymer (hereunder referred to as "PP-A") having an ethylene content of 9.8% by weight, boiling n-heptane-insoluble matter of 95.8% by weight and a melt flow index (MI) of 8.6 g/10 min (as determined according to ASTM D-1238, at 230° C.), 70 parts by weight of an ethylene-propylene random copolymer (hereunder referred to as "PP-B") having an ethylene content of 4.0% by weight and a melt flow index (MI) of 8.0 g/10 min or 70 parts by weight of a propylene homopolymer (hereunder referred to as "PP-C") having a melt flow index (MI) of 8.0 g/10 min, as a polypropylene component; 30 parts by weight of an ethylene-propylene-diene terpolymeric rubber (hereunder referred to as "EPDM-A") having a propylene content of 30% by weight, a Mooney viscosity, $ML_{1+4}$ (100° C.), of 20 and an iodine value of 22 and whose diene component is dicyclopentadiene or 30 parts by weight of an ethylene-propylene-diene terpolymeric rubber (hereunder referred to as "EPDM-B") having a propylene content of 28% by weight, a Mooney viscosity, $ML_{1+4}$ (100° C.), of 22 and an iodine value of 23 and whose diene component is ethylidene norbornene, as a terpolymeric rubber component; 0.05 part by weight of 2,6-di-t-butyl-4-methylphenol (hereunder referred to as "Stabilizer-A"), 0.1 part by weight of calcium stearate (hereunder referred to as "Stabilizer-B") and 0.1 part by weight of tetrakis-(methylene-3-(3',5'-di-t-butyl-4'-hydroxyphenyl)propionate)-methane (hereunder referred to as "Stabilizer-C") as stabilizers, the resulting mixture was pelletized with an extruder having a diameter of 40 mm which was maintained at 230° C. and the resulting resin composition was injection-molded to give a test piece (a flat plate having a size of 80×160×2 mm). Then a two-pack type acrylic-chlorinated polypropylene paint or varnish for underlying coating was applied onto the foregoing test piece in a film thickness of 10 μm, dried at 80° C. for 30 minutes, a two-pack type urethane paint or varnish for top coat was applied to the underlying coating in a thickness of 50 μm, baked and dried at 80° C. for 40 minutes, followed by allowing to stand at room temperature for 48 hours to give a coated article. After making the coated article, on the coated film of the coated article, a cut having a width of 1.0 cm was made with a cutter knife, the 180° peel strength (kg/cm) of the coated film was determined at a speed of 30 mm/min with an Instron tensile tester. Moreover, the notched test piece was subjected to the Izod impact test according to JIS K-7110 to determine Izod impact strength (kg·cm/cm). The results thus obtained are summarized in the following Table 1. In Table 1, "NB" appearing in the column of "Izod impact strength" means that the corresponding test piece was not broken even at an impact of 40 kg·cm/cm, in other words the Izod impact strength was more than 40 kg·cm/cm.

Examples 7 to 12

The same procedures and tests used in Examples 1 to 6 were repeated except that a one-pack type alkyd-melamine resin paint was used as a paint for top coat and it was baked and dried at 120° C. for 40 minutes. The results obtained are listed in the following Table 2.

Examples 13 to 24

The same procedures and tests used in Examples 1 to 12 were repeated except that the test piece was irradiated with plasma under the following conditions instead of the application of a primer coating. The results obtained are listed in the following Tables 3 and 4.

| (Conditions for the Plasma Treatment) | | |
|---|---|---|
| (1) | Apparatus for plasma treatment: | Microwave Plasma Treating Apparatus (TMZ-202 6M; available from Toshiba Corporation) |
| (2) | Treating gas: | oxygen |
| (3) | Treating time: | 5 seconds |
| (4) | Inner pressure of the treating chamber: | 1.0 Torr |
| (5) | Gas flow rate: | 480 cc/min |
| (6) | Microwave power output: | 900 W. |

Examples 25 to 30

The same procedures and tests used in Examples 1, 7, 13 and 19 were repeated except that 70 parts by weight of PP-A was used as a polypropylene component, that 30 parts by weight of EPDM-A or EPDM-B was used as a terpolymeric rubber component and that 10, 20 or 30 parts by weight of talc was used as an inorganic filler. The results obtained are listed in the following Table 5.

Comparative Examples 1 to 3

The same procedures and tests used in Examples 1, 7, 13 and 19 were repeated except that 100 parts by weight of PP-A, PP-B or PP-C without using any terpolymeric rubber component and that the resulting test piece was exposed to an atmosphere saturated with 1,1,1-trichloroethane for 100 seconds to perform washing with an organic solvent and then allowed to stand for 10 minutes in an oven maintained at 100° C. to remove the organic solvent. The results obtained are listed in the following Table 6.

Comparative Examples 4 to 6

The same procedures and tests used in Comparative Examples 1 to 3 were repeated except that the application of a top coat was performed immediately after the molding of test pieces without washing with 1,1,1-trichloroethane. The results obtained are listed in the following Table 6.

Comparative Examples 7 to 9

The same procedures and tests used in Comparative Example 4 were repeated except that talc was used in an amount of 10, 20 or 30 parts by weight per 100 parts by weight of PP-A. The results obtained are listed in the following Table 7.

Comparative Examples 10 to 15

The same procedures and tests used in Comparative Example 4 were repeated except that an ethylene-propylene-diene terpolymeric rubber (hereunder referred to as "EPDM-C") having a propylene content of 30% by weight, a Mooney viscosity, $ML_{1+4}$ (100° C.), of 20 and an iodine value of 10 and whose diene component as the third component is dicyclopentadiene or an ethylene-propylene-diene terpolymeric rubber (hereunder referred to as "EPDM-D") having a propylene content of 28% by weight, a Mooney viscosity, $ML_{1+4}$ (100° C.), of 22 and an iodine value of 11 and whose diene component as the third component is ethylidene norbornene was used in an amount (part by weight) as listed in the following Table 8. The results obtained are listed in the following Table 8.

Comparative Examples 16 to 21

The same procedures and tests used in Comparative Example 4 were repeated except that PP-A and an ethylene-propylene-diene terpolymeric rubber (hereunder referred to as "EPDM-E") having a propylene content of 30% by weight, a Mooney viscosity, $ML_{1+4}$ (100° C.), of 55 and an iodine value of 19 and whose diene component as the third component is dicyclopentadiene or an ethylene-propylene-diene terpolymeric rubber (hereunder referred to as "EPDM-F") having a propylene content of 28% by weight, a Mooney viscosity, $ML_{1+4}$ (100° C.), of 57 and an iodine value of 21 and whose diene component as the third component is ethylidene norbornene were used in amounts (part by weight) as listed in the following Table 9. The results obtained are listed in the following Table 9. In each case, the gloss and appearance of the resulting molded product were insufficient and it was liable to cause defects.

Examples 31 to 36

There were blended and mixed in a Henschel mixer, 70 parts by weight of PP-A, PP-B or PP-C as a polypropylene component; 30 parts by weight of EPDM-A or EPDM-B as a terpolymeric rubber component; and 0.05 part by weight of Stabilizer-A, 0.1 part by weight of Stabilizer-B and 0.1 part by weight of Stabilizer-C as stabilizers, the resulting mixture was pelletized with an extruder having a diameter of 40 mm maintained at 230° C. and the resulting resin composition was formed into a test piece (a flat plate having a size of 80×160×2 mm) through injection molding. Then the test piece was washed with an organic solvent by exposing it to an atmosphere saturated with 1,1,1-trichloroethane for 100 seconds and thereafter allowed to stand for 10 minutes in an oven maintained at 100° C. to thus remove the organic solvent. Subsequently, a two-pack type urethane paint for top coat was applied onto the test piece so that the thickness thereof was equal to 50 μm, baked and dried at 80° C. for 30 minutes and then allowed to stand at room temperature for 48 hours to thus give a coated product. After making the coated artical, on the coated film of the coated product, a cut having a width of 1.0 cm was made with a cutter knife, the 180° peel strength (kg/cm) of the coated film was determined at a speed of 30 mm/min with an Instron tensile tester. The results thus obtained are summarized in the following Table 10.

Examples 37 to 42

The same procedures and tests used in Examples 31 to 36 were repeated except that a one-pack type alkyd-melamine resin paint was used as a paint for top coat and it was baked and dried at 120° C. for 30 minutes. The results obtained are listed in the following Table 11.

Examples 43 to 48

The same procedures and tests used in Examples 31 and 37 were repeated except that 70 parts by weight of PP-A was used as a polypropylene component, that 30 parts by weight of EPDM-A or EPDM-B was used as a terpolymeric rubber component and that 10, 20 or 30 parts by weight of talc was used as an inorganic filler. The results obtained are listed in the following Table 12.

Examples 49 to 54

The same procedures and tests used in Examples 31, 34, 37 and 40 were repeated except that the degreasing and washing of the test piece was performed by wiping with a cloth dampened with isopropyl alcohol, a surfactant-containing phosphoric acid aqueous solution or benzene. The results thus obtained are listed in the following Table 13.

Comparative Examples 22 to 24

The same procedures and tests used in Examples 31 and 37 were repeated except that the terpolymeric rubber component was not used and 100 parts by weight of PP-A, PP-B or PP-C was used. The wash of the resulting test piece with an organic solvent was performed by exposing it in an atmosphere saturated with 1,1,1-trichloroethane for 100 seconds and then the test piece was allowed to stand in an oven maintained at 100° C. for 10 minutes to thus remove the organic solvent. The results thus obtained are listed in the following Table 14.

Comparative Examples 25 to 27

The same procedures and tests used in Comparative Examples 22 were repeated except that talc was added to the resin composition in an amount of 10, 20 or 30 parts by weight per 100 parts by weight of PP-A. The results thus obtained are listed in the following Table 15.

Comparative Examples 28 to 33

The same procedures and tests used in Comparative Examples 22 were repeated except that PP-A and EPDM-C or EPDM-D were used in the amounts (part by weight) as listed in the following Table 16. The results thus obtained are listed in Table 16.

Comparative Examples 34 to 39

The same procedures and tests used in Comparative Examples 22 were repeated except that PP-A and EPDM-E or EPDM-F were used in the amounts (part by weight) as listed in the following Table 17. The results thus obtained are listed in Table 17. In each case, the gloss and the appearance of the resulting molded product were insufficient and the product was liable to cause defects.

TABLE 1

| Example No. | 1 | 2 | 3 | 4 | 5 | 6 |
| --- | --- | --- | --- | --- | --- | --- |
| PP-A | 70 | | | 70 | | |
| PP-B | | 70 | | | 70 | |
| PP-C | | | 70 | | | 70 |
| EPDM-A | 30 | 30 | 30 | | | |
| EPDM-B | | | | 30 | 30 | 30 |
| Stabilizer-A | 0.05 | 0.05 | 0.05 | 0.05 | 0.05 | 0.05 |
| Stabilizer-B | 0.1 | 0.1 | 0.1 | 0.1 | 0.1 | 0.1 |
| Stabilizer-C | 0.1 | 0.1 | 0.1 | 0.1 | 0.1 | 0.1 |
| TCE Degreasing . Washing Process | No | No | No | No | No | No |
| Primer Coating | Did | Did | Did | Did | Did | Did |
| Peel Strength of Coated Film | 1.35 | 1.30 | 1.20 | 0.85 | 0.80 | 0.80 |
| Izod Impact Strength | NB | NB | NB | NB | NB | NB |

TABLE 2

| Example No. | 7 | 8 | 9 | 10 | 11 | 12 |
| --- | --- | --- | --- | --- | --- | --- |
| PP-A | 70 | | | 70 | | |
| PP-B | | 70 | | | 70 | |
| PP-C | | | 70 | | | 70 |
| EPDM-A | 30 | 30 | 30 | | | |
| EPDM-B | | | | 30 | 30 | 30 |
| Stabilizer-A | 0.05 | 0.05 | 0.05 | 0.05 | 0.05 | 0.05 |
| Stabilizer-B | 0.1 | 0.1 | 0.1 | 0.1 | 0.1 | 0.1 |
| Stabilizer-C | 0.1 | 0.1 | 0.1 | 0.1 | 0.1 | 0.1 |
| TCE Degreasing . Washing Process | No | No | No | No | No | No |
| Primer Coating | Did | Did | Did | Did | Did | Did |
| Peel Strength of Coated Film | 1.30 | 1.20 | 1.15 | 0.90 | 0.85 | 0.85 |
| Izod Impact Strength | NB | NB | NB | NB | NB | NB |

TABLE 3

| Example No. | 13 | 14 | 15 | 16 | 17 | 18 |
| --- | --- | --- | --- | --- | --- | --- |
| PP-A | 70 | | | 70 | | |
| PP-B | | 70 | | | 70 | |
| PP-C | | | 70 | | | 70 |
| EPDM-A | 30 | 30 | 30 | | | |
| EPDM-B | | | | 30 | 30 | 30 |
| Stabilizer-A | 0.05 | 0.05 | 0.05 | 0.05 | 0.05 | 0.05 |
| Stabilizer-B | 0.1 | 0.1 | 0.1 | 0.1 | 0.1 | 0.1 |
| Stabilizer-C | 0.1 | 0.1 | 0.1 | 0.1 | 0.1 | 0.1 |
| TCE Degreasing . Washing Process | No | No | No | No | No | No |
| Irradiation with Plasma | Did | Did | Did | Did | Did | Did |
| Peel Strength of Coated Film | 1.25 | 1.20 | 1.20 | 0.90 | 0.85 | 0.85 |
| Izod Impact Strength | NB | NB | NB | NB | NB | NB |

TABLE 4

| Example No. | 19 | 20 | 21 | 22 | 23 | 24 |
| --- | --- | --- | --- | --- | --- | --- |
| PP-A | 70 | | | 70 | | |
| PP-B | | 70 | | | 70 | |
| PP-C | | | 70 | | | 70 |
| EPDM-A | 30 | 30 | 30 | | | |
| EPDM-B | | | | 30 | 30 | 30 |
| Stabilizer-A | 0.05 | 0.05 | 0.05 | 0.05 | 0.05 | 0.05 |
| Stabilizer-B | 0.1 | 0.1 | 0.1 | 0.1 | 0.1 | 0.1 |
| Stabilizer-C | 0.1 | 0.1 | 0.1 | 0.1 | 0.1 | 0.1 |
| TCE Degreasing . Washing Process | No | No | No | No | No | No |
| Irradiation with Plasma | Did | Did | Did | Did | Did | Did |
| Peel Strength of Coated Film | 1.30 | 1.25 | 1.25 | 0.90 | 0.85 | 0.85 |
| Izod Impact Strength | NB | NB | NB | NB | NB | NB |

TABLE 5

| Example No. | 25 | 26 | 27 | 28 | 29 | 30 |
|---|---|---|---|---|---|---|
| PP-A | 70 | 70 | 70 | 70 | 70 | 70 |
| EPDM-A | 30 | 30 | 30 | | | |
| EPDM-B | | | | 30 | 30 | 30 |
| Talc | 10 | 20 | 30 | 10 | 20 | 30 |
| Stabilizer-A | 0.05 | 0.05 | 0.05 | 0.05 | 0.05 | 0.05 |
| Stabilizer-B | 0.10 | 0.10 | 0.10 | 0.10 | 0.10 | 0.10 |
| Stabilizer-C | 0.10 | 0.10 | 0.10 | 0.10 | 0.10 | 0.10 |
| TCE Degreasing . Washing Process | No | No | No | No | No | No |
| Peel Strength of Coated Film: One-pack Type | | | | | | |
| Primer-Coated Product | 1.25 | 1.20 | 1.20 | 0.90 | 0.90 | 0.85 |
| Plasma-Irradiated Product | 1.25 | 1.15 | 1.20 | 0.90 | 0.95 | 0.90 |
| Peel Strength of Coated Film: Two-pack Type | | | | | | |
| Primer-Coated Product | 1.20 | 1.20 | 1.15 | 0.90 | 0.85 | 0.85 |
| Plasma-Irradiated Product | 1.25 | 1.20 | 1.20 | 0.90 | 0.80 | 0.85 |
| Izod Impact Strength | NB | NB | NB | NB | NB | NB |

TABLE 6

| Comparative Example No. | 1 | 2 | 3 | 4 | 5 | 6 |
|---|---|---|---|---|---|---|
| PP-A | 100 | | | 100 | | |
| PP-B | | 100 | | | 100 | |
| PP-C | | | 100 | | | 100 |
| Stabilizer-A | 0.05 | 0.05 | 0.05 | 0.05 | 0.05 | 0.05 |
| Stabilizer-B | 0.10 | 0.10 | 0.10 | 0.10 | 0.10 | 0.10 |
| Stabilizer-C | 0.10 | 0.10 | 0.10 | 0.10 | 0.10 | 0.10 |
| TCE Degreasing . Washing Process | Did | Did | Did | No | No | No |
| Peel Strength of Coated Film: One-pack Type | | | | | | |
| Primer-Coated Product | <0.3 | <0.3 | <0.3 | <0.3 | <0.3 | <0.3 |
| Plasma-Irradiated Product | <0.3 | <0.3 | <0.3 | <0.3 | <0.3 | <0.3 |
| Peel Strength of Coated Film: Two-pack Type | | | | | | |
| Primer-Coated Product | <0.3 | <0.3 | <0.3 | <0.3 | <0.3 | <0.3 |
| Plasma-Irradiated Product | <0.3 | <0.3 | <0.3 | <0.3 | <0.3 | <0.3 |
| Izod Impact Strength | 8 | 2 | 2 | 8 | 2 | 2 |

TABLE 7

| Comparative Example No. | 7 | 8 | 9 |
|---|---|---|---|
| PP-A | 100 | 100 | 100 |
| Talc | 10 | 20 | 30 |
| Stabilizer-A | 0.05 | 0.05 | 0.05 |
| Stabilizer-B | 0.10 | 0.10 | 0.10 |
| Stabilizer-C | 0.10 | 0.10 | 0.10 |
| TCE Degreasing . Washing Process | No | No | No |
| Peel Strength of Coated Film: One-pack Type | | | |
| Primer-Coated Product | <0.3 | <0.3 | <0.3 |
| Plasma-Irradiated Product | <0.3 | <0.3 | <0.3 |
| Peel Strength of Coated Film: Two-pack Type | | | |
| Primer-Coated Product | <0.3 | <0.3 | <0.3 |
| Plasma-Irradiated Product | <0.3 | <0.3 | <0.3 |
| Izod Impact Strength | 4 | 3.5 | 3 |

TABLE 8

| Comparative Example No. | 10 | 11 | 12 | 13 | 14 | 15 |
|---|---|---|---|---|---|---|
| PP-A | 90 | 80 | 70 | 90 | 80 | 70 |
| EPDM-C | 10 | 20 | 30 | | | |
| EPDM-D | | | | 10 | 20 | 30 |
| Stabilizer-A | 0.05 | 0.05 | 0.05 | 0.05 | 0.05 | 0.05 |
| Stabilizer-B | 0.10 | 0.10 | 0.10 | 0.10 | 0.10 | 0.10 |
| Stabilizer-C | 0.10 | 0.10 | 0.10 | 0.10 | 0.10 | 0.10 |
| TCE Degreasing . Washing Process | No | No | No | No | No | No |
| Peel Strength of Coated Film: One-pack Type | | | | | | |
| Primer-Coated Product | <0.3 | <0.3 | <0.3 | <0.3 | <0.3 | <0.3 |
| Plasma-Irradiated Product | <0.3 | <0.3 | <0.3 | <0.3 | <0.3 | <0.3 |
| Peel Strength of Coated Film: Two-pack Type | | | | | | |
| Primer-Coated Product | <0.3 | <0.3 | <0.3 | <0.3 | <0.3 | <0.3 |
| Plasma-Irradiated Product | <0.3 | <0.3 | <0.3 | <0.3 | <0.3 | <0.3 |
| Izod Impact Strength | NB | NB | NB | NB | NB | NB |

TABLE 9

| Comparative Example No. | 16 | 17 | 18 | 19 | 20 | 21 |
|---|---|---|---|---|---|---|
| PP-A | 90 | 80 | 70 | 90 | 80 | 70 |
| EPDM-E | 10 | 20 | 30 | | | |
| EPDM-F | | | | 10 | 20 | 30 |
| Stabilizer-A | 0.05 | 0.05 | 0.05 | 0.05 | 0.05 | 0.05 |
| Stabilizer-B | 0.10 | 0.10 | 0.10 | 0.10 | 0.10 | 0.10 |
| Stabilizer-C | 0.10 | 0.10 | 0.10 | 0.10 | 0.10 | 0.10 |
| TCE Degreasing . Washing Process | No | No | No | No | No | No |
| Peel Strength of Coated Film: One-pack Type | | | | | | |
| Primer-Coated Product | <0.3 | <0.3 | <0.3 | <0.3 | <0.3 | <0.3 |
| Plasma-Irradiated Product | <0.3 | <0.3 | <0.3 | <0.3 | <0.3 | <0.3 |
| Peel Strength of Coated Film: Two-pack Type | | | | | | |
| Primer-Coated Product | <0.3 | <0.3 | <0.3 | <0.3 | <0.3 | <0.3 |
| Plasma-Irradiated Product | <0.3 | <0.3 | <0.3 | <0.3 | <0.3 | <0.3 |
| Izod Impact Strength | NB | NB | NB | NB | NB | NB |

TABLE 10

| Example No. | 31 | 32 | 33 | 34 | 35 | 36 |
|---|---|---|---|---|---|---|
| PP-A | 70 | | | 70 | | |
| PP-B | | 70 | | | 70 | |
| PP-C | | | 70 | | | 70 |
| EPDM-A | 30 | 30 | 30 | | | |
| EPDM-B | | | | 30 | 30 | 30 |
| Stabilizer-A | 0.05 | 0.05 | 0.05 | 0.05 | 0.05 | 0.05 |
| Stabilizer-B | 0.1 | 0.1 | 0.1 | 0.1 | 0.1 | 0.1 |
| Stabilizer-C | 0.1 | 0.1 | 0.1 | 0.1 | 0.1 | 0.1 |
| TCE Degreasing . Washing Process | Did | Did | Did | Did | Did | Did |
| Primer Coating | No | No | No | No | No | No |
| Peel Strength of Coated Film | 1.50 | 1.45 | 1.30 | 1.40 | 1.10 | 1.10 |
| Izod Impact Strength | NB | NB | NB | NB | NB | NB |

TABLE 11

| Example No. | 37 | 38 | 39 | 40 | 41 | 42 |
|---|---|---|---|---|---|---|
| PP-A | 70 | | | 70 | | |
| PP-B | | 70 | | | 70 | |
| PP-C | | | 70 | | | 70 |
| EPDM-A | 30 | 30 | 30 | | | |

TABLE 11-continued

| Example No. | 37 | 38 | 39 | 40 | 41 | 42 |
|---|---|---|---|---|---|---|
| EPDM-B | | | | 30 | 30 | 30 |
| Stabilizer-A | 0.05 | 0.05 | 0.05 | 0.05 | 0.05 | 0.05 |
| Stabilizer-B | 0.1 | 0.1 | 0.1 | 0.1 | 0.1 | 0.1 |
| Stabilizer-C | 0.1 | 0.1 | 0.1 | 0.1 | 0.1 | 0.1 |
| TCE Degreasing . Washing Process | Did | Did | Did | Did | Did | Did |
| Primer Coating | No | No | No | No | No | No |
| Peel Strength of Coated Film | 1.50 | 1.40 | 1.40 | 1.40 | 1.35 | 1.30 |
| Izod Impact Strength | NB | NB | NB | NB | NB | NB |

TABLE 12

| Example No. | 43 | 44 | 45 | 46 | 47 | 48 |
|---|---|---|---|---|---|---|
| PP-A | 70 | 70 | 70 | 70 | 70 | 70 |
| EPDM-A | 30 | 30 | 30 | | | |
| EPDM-B | | | | 30 | 30 | 30 |
| Talc | 10 | 20 | 30 | 10 | 20 | 30 |
| Stabilizer-A | 0.05 | 0.05 | 0.05 | 0.05 | 0.05 | 0.05 |
| Stabilizer-B | 0.10 | 0.10 | 0.10 | 0.10 | 0.10 | 0.10 |
| Stabilizer-C | 0.10 | 0.10 | 0.10 | 0.10 | 0.10 | 0.10 |
| TCE Degreasing . Washing Process | Did | Did | Did | Did | Did | Did |
| Peel Strength of Coated Film: One-pack Type | 1.30 | 1.25 | 1.25 | 1.20 | 1.15 | 1.05 |
| Peel Strength of Coated Film: Two-pack Type | 1.40 | 1.35 | 1.30 | 1.25 | 1.20 | 1.15 |
| Izod Impact Strength | NB | NB | NB | NB | NB | NB |

TABLE 13

| Example No. | 49 | 50 | 51 | 52 | 53 | 54 |
|---|---|---|---|---|---|---|
| PP-A | 70 | 70 | 70 | 70 | 70 | 70 |
| EPDM-A | 30 | 30 | 30 | | | |
| EPDM-B | | | | 30 | 30 | 30 |
| Stabilizer-A | 0.05 | 0.05 | 0.05 | 0.05 | 0.05 | 0.05 |
| Stabilizer-B | 0.10 | 0.10 | 0.10 | 0.10 | 0.10 | 0.10 |
| Stabilizer-C | 0.10 | 0.10 | 0.10 | 0.10 | 0.10 | 0.10 |
| Degreasing . Washing: | | | | | | |
| Isopropyl Alcohol | Did | | Did | | | |
| Surfactant-Containing Phosphoric Acid Aqueous Solution | | Did | | Did | | |
| Benzene | | | Did | | | Did |
| Peel Strength of Coated Film: One-pack Type | 0.90 | 0.90 | 0.90 | 0.80 | 0.80 | 0.80 |
| Peel Strength of Coated Film: Two-pack Type | 1.00 | 0.95 | 0.95 | 0.80 | 0.80 | 0.80 |
| Izod Impact Strength | NB | NB | NB | NB | NB | NB |

TABLE 14

| Comparative Example No. | 22 | 23 | 24 |
|---|---|---|---|
| PP-A | 100 | | |
| PP-B | | 100 | |
| PP-C | | | 100 |
| Stabilizer-A | 0.05 | 0.05 | 0.05 |
| Stabilizer-B | 0.10 | 0.10 | 0.10 |
| Stabilizer-C | 0.10 | 0.10 | 0.10 |
| TCE Degreasing . Washing Process | Did | Did | Did |
| Peel Strength of Coated Film: One-pack Type | <0.3 | <0.3 | <0.3 |
| Peel Strength of Coated Film: Two-pack Type | <0.3 | <0.3 | <0.3 |
| Izod Impact Strength | NB | NB | NB |

TABLE 15

| Comparative Example No. | 25 | 26 | 27 |
|---|---|---|---|
| PP-A | 100 | 100 | 100 |
| Talc | 10 | 20 | 30 |
| Stabilizer-A | 0.05 | 0.05 | 0.05 |
| Stabilizer-B | 0.10 | 0.10 | 0.10 |
| Stabilizer-C | 0.10 | 0.10 | 0.10 |
| TCE Degreasing . Washing Process | Did | Did | Did |
| Peel Strength of Coated Film: One-pack Type | <0.3 | <0.3 | <0.3 |
| Peel Strength of Coated Film: Two-pack Type | <0.3 | <0.3 | <0.3 |
| Izod Impact Strength | 4 | 3.5 | 3 |

TABLE 16

| Comparative Example No. | 28 | 29 | 30 | 31 | 32 | 33 |
|---|---|---|---|---|---|---|
| PP-A | 90 | 80 | 70 | 90 | 80 | 70 |
| EPDM-C | 10 | 20 | 30 | | | |
| EPDM-D | | | | 10 | 20 | 30 |
| Stabilizer-A | 0.05 | 0.05 | 0.05 | 0.05 | 0.05 | 0.05 |
| Stabilizer-B | 0.10 | 0.10 | 0.10 | 0.10 | 0.10 | 0.10 |
| Stabilizer-C | 0.10 | 0.10 | 0.10 | 0.10 | 0.10 | 0.10 |
| TCE Degreasing · Washing Process | Did | Did | Did | Did | Did | Did |
| Primer Coating | No | No | No | No | No | No |
| Peel Strength of Coated Film: One-pack Type | <0.3 | <0.3 | <0.3 | <0.3 | <0.3 | <0.3 |
| Peel Strength of Coated Film: Two-pack Type | <0.3 | <0.3 | <0.3 | <0.3 | <0.3 | <0.3 |
| Izod Impact Strength | N B | N B | N B | N B | N B | N B |

TABLE 17

| Comparative Example No. | 34 | 35 | 36 | 37 | 38 | 39 |
|---|---|---|---|---|---|---|
| PP-A | 90 | 80 | 70 | 90 | 80 | 70 |
| EPDM-E | 10 | 20 | 30 | | | |
| EPDM-F | | | | 10 | 20 | 30 |
| Stabilizer-A | 0.05 | 0.05 | 0.05 | 0.05 | 0.05 | 0.05 |
| Stabilizer-B | 0.10 | 0.10 | 0.10 | 0.10 | 0.10 | 0.10 |
| Stabilizer-C | 0.10 | 0.10 | 0.10 | 0.10 | 0.10 | 0.10 |
| TCE Degreasing · Washing Process | Did | Did | Did | Did | Did | Did |
| Primer Coating | No | No | No | No | No | No |
| Peel Strength of Coated Film: One-pack Type | <0.3 | <0.3 | <0.3 | <0.3 | <0.3 | <0.3 |
| Peel Strength of Coated Film: Two-pack Type | <0.3 | <0.3 | <0.3 | <0.3 | <0.3 | <0.3 |
| Izod Impact Strength | N B | N B | N B | N B | N B | N B |

The polypropylene resin composition according to the present invention permits the application of a top coat after a pretreatment such as the application of a primer layer or the irradiation with plasma without washing with a halogen atom-containing organic solvent or further permits the application of a top coat after simply washing with a halogen atom-containing organic solvent without subjecting any pretreatment such as the application of a primer layer or the irradiation with plasma and can provide molded products excellent in bond strength against coated films applied thereto and, if necessary, molded products having both excellent bond strength and high impact resistance. Therefore, the resin composition has enough industrial value.

What is claimed is:

1. A polypropylene resin composition excellent in capacity of being coated consisting essentially of (A) a polypropylene; (B) an ethylene-propylene-diene terpolymeric rubber having a Mooney viscosity, $ML_{1+4}$ (100° C.), ranging from 5 to 50 and an iodine value of not less than 15, the content of the component (B) ranging from 10 to 50% by weight on the basis of the total weight of the components (A) and (B); and (C) an inorganic filler in an amount ranging from 0 to 40 parts by weight per 100 parts by weight of the sum of the components (A) and (B) wherein the composition is capable of being coated with a top layer after application of a primer layer or irradiation with plasma without degreasing or washing or of being coated with a top layer after degreasing and washing without applying a primer layer or being irradiated with plasma.

2. The polypropylene resin composition of claim 1 wherein the polypropylene (A) is a homopolymer of propylene or a random or block copolymer of propylene and ethylene.

3. The polypropylene resin composition of claim 2 wherein the block copolymer of propylene and ethylene has an ethylene content ranging from 5 to 25% by weight and a melt index (as determined according to ASTM D-1238, at 230° C.) ranging from 0.1 to 100 g/10 min.

4. The polypropylene resin composition of claim 1 wherein the ethylene-propylene-diene terpolymeric rubber (B) has a Mooney viscosity, $ML_{1+4}$ (100° C.), ranging from 10 to 30.

5. The polypropylene resin composition of claim 1 wherein the ethylene-propylene-diene terpolymeric rubber (B) has an iodine value ranging from 17 to 25.

6. The polypropylene resin composition of claim 5 wherein the ethylene-propylene-diene terpolymeric rubber (B) has an iodine value ranging from 21 to 25.

7. The polypropylene resin composition of claim 1 wherein the ethylene-propylene-diene terpolymeric rubber (B) has a Mooney viscosity, $ML_{1+4}$ (100° C.), ranging from 10 to 30, an iodine value ranging from 21 to 25 and a propylene content ranging from 15 to 50% by weight.

8. The polypropylene resin composition of claim 1 wherein the diene component of the terpolymeric rubber (B) is a member selected from the group consisting of dicyclopentadiene, ethylidene norbornene and 1,4-hexadiene.

9. The polypropylene resin composition of claim 1 wherein the diene component of the terpolymeric rubber (B) is dicyclopentadiene.

10. The polypropylene resin composition of claim 1 wherein the content of the component (B) ranges from 25 to 40% by weight on the basis of the total weight of the components (A) and (B).

11. The polypropylene resin composition of claim 1 wherein the component (C) has an average particle size of not more than 5 μm.

12. The polypropylene resin composition of claim 1 wherein the amount of the component (C) ranges from 10 to 30 parts by weight per 100 parts by weight of the sum of the components (A) and (B).

* * * * *